(12) United States Patent
Kishimoto

(10) Patent No.: US 10,119,888 B2
(45) Date of Patent: Nov. 6, 2018

(54) TEMPERATURE SENSOR INTEGRATED TYPE SEMICONDUCTOR PRESSURE SENSOR APPARATUS

(71) Applicant: Mitsubishi Electric Corporation, Tokyo (JP)

(72) Inventor: Hiroyuki Kishimoto, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 190 days.

(21) Appl. No.: 15/216,001

(22) Filed: Jul. 21, 2016

(65) Prior Publication Data

US 2017/0292897 A1   Oct. 12, 2017

(30) Foreign Application Priority Data

Apr. 6, 2016   (JP) .................. 2016-076302

(51) Int. Cl.
| | |
|---|---|
| *G01K 7/22* | (2006.01) |
| *G01L 9/00* | (2006.01) |
| *G01L 9/14* | (2006.01) |
| *G01L 19/04* | (2006.01) |
| *G01M 15/05* | (2006.01) |

(52) U.S. Cl.
CPC .............. *G01M 15/05* (2013.01); *G01K 7/22* (2013.01); *G01L 9/0054* (2013.01)

(58) Field of Classification Search
CPC ........... G01K 7/22; G01L 9/00; G01L 9/0054; G01L 9/14; G01L 19/04
See application file for complete search history.

(56) References Cited

U.S. PATENT DOCUMENTS

| | | | |
|---|---|---|---|
| 5,948,989 A | 9/1999 | Ichikawa et al. | |
| 7,690,262 B2 * | 4/2010 | Nakabayashi | ........... G01K 1/18 |
| | | | 73/708 |

(Continued)

FOREIGN PATENT DOCUMENTS

| | | | | |
|---|---|---|---|---|
| FR | 2846416 A1 * | 4/2004 | ............... | G01K 7/22 |
| JP | 3319990 B2 | 9/2002 | | |

(Continued)

OTHER PUBLICATIONS

Communication dated Oct. 18, 2016, from the Japanese Patent Office in counterpart application No. 2016-076302.

*Primary Examiner* — Nguyen Ha
(74) *Attorney, Agent, or Firm* — Sughrue Mion, PLLC; Richard C. Turner

(57) ABSTRACT

A temperature sensor integrated type semiconductor pressure sensor apparatus includes a temperature detection device, a lead wire covered with a lead wire protection material, and a terminal, which are integrated together by a thermoplastic resin. This can prevent the lead wire from being deformed in the assembly process, thereby simplifying the assembly process. Furthermore, the temperature detection device is exposed from the opening at the tip of the protrusion, which can secure enough temperature response. Furthermore, the temperature detection device, the lead wire and the lead wire protection material are covered with the thermoplastic resin, so they are protected from combustion gas component, oil contaminant and corrosion product included in intake air.

7 Claims, 3 Drawing Sheets

(56) References Cited

U.S. PATENT DOCUMENTS

| | | | |
|---|---|---|---|
| 2005/0210990 A1* | 9/2005 | Hayashi | G01K 7/22 |
| | | | 73/708 |
| 2007/0121701 A1 | 5/2007 | Gennissen et al. | |
| 2007/0186659 A1* | 8/2007 | Engelhardt | G01D 11/245 |
| | | | 73/708 |

FOREIGN PATENT DOCUMENTS

| | | | | |
|---|---|---|---|---|
| JP | 2011033531 A * | 2/2011 | | G01L 19/04 |
| JP | 5137914 B2 | 2/2013 | | |
| JP | 5153126 B2 | 2/2013 | | |
| JP | 2014142327 A * | 8/2014 | | G01K 1/14 |

\* cited by examiner

TEMPERATURE SENSOR INTEGRATED TYPE SEMICONDUCTOR PRESSURE SENSOR APPARATUS

BACKGROUND OF THE INVENTION

Field of the Invention

The present invention relates to a temperature sensor integrated type semiconductor pressure sensor apparatus that is used for, for example, detecting a change in pressure and a change in temperature in an intake manifold of an internal combustion engine.

Description of the Background Art

One known apparatus for detecting a change in pressure and a change in temperature of intake air flowing in an intake manifold of an internal combustion engine is a temperature sensor integrated type semiconductor pressure sensor apparatus including a temperature detection device. A conventional temperature sensor integrated type semiconductor pressure sensor apparatus includes a pressure guiding path containing a pressure detection device and a container containing a temperature sensor module, which are formed adjacent to each other, in a resin case.

For example, a temperature sensor integrated type semiconductor pressure sensor apparatus disclosed in PTL 1 includes a protrusion in a container containing a temperature sensor module. A temperature detection device is housed within a highly heat-conductive member attached to the tip of the protrusion and held by a seal member filling the inside of the highly heat-conductive member (see FIG. 2). The highly heat-conductive member includes a polybutylene terephthalate resin (hereinafter referred to as a PBT resin), which is a thermoplastic resin, and a filler for enhancing heat conductivity.

In this prior example, the temperature detection device is covered with the highly heat-conductive member, which facilitates transfer of heat of intake air within the intake manifold to the temperature detection device, improving the temperature response of the temperature detection device to a change in temperature of intake air.

Also, the temperature detection device and a lead wire are housed within the protrusion, which protects them from combustion gas component, oil contaminant and corrosion product included in intake air, and furthermore, prevents foreign material included in intake air from colliding with the temperature detection device.

[PTL 1] Japanese Patent No. 5,137,914

However, the temperature sensor integrated type semiconductor pressure sensor apparatus presented in the PTL 1 is configured such that the highly heat-conductive member is attached to a conventional case, which increases the material cost and the cost for highly heat-conductive member forming process, causing a problem of increasing the manufacturing cost.

Also, in the assembly process, a terminal integrated with a housing by insert molding is connected to the lead wire connected to the temperature detection device, then the seal member is injected into the highly heat-conductive member attached to the tip of the protrusion, and then the housing is fitted to the case, however, this process is performed manually.

Since the lead wire has a wire diameter of as thin as φ0.2 or so, if, in the fitting, the temperature detection device interferes with the case before the temperature detection device is housed within the highly heat-conductive member, the lead wire is deformed. If the lead wire is deformed, the position at which the temperature detection device is housed deviates from an intended position, so the temperature detection accuracy decreases. Accordingly, the temperature detection device needs to be housed accurately at a defined position within the highly heat-conductive member, however, this work has difficulty in automation, which causes the manufacturing cost to be increased.

SUMMARY OF THE INVENTION

In order to solve the above problem, it is an object of the present invention to provide a temperature sensor integrated type semiconductor pressure sensor apparatus that can simplify the assembly process and reduce the manufacturing cost.

The temperature sensor integrated type semiconductor pressure sensor apparatus in accordance with the invention is a temperature sensor integrated type semiconductor pressure sensor apparatus in which a pressure sensor module and a temperature sensor module are contained in a resin enclosure. The enclosure includes: a pressure guiding path containing a pressure detection device of the pressure sensor module; a container provided adjacent to the pressure guiding path, containing the temperature sensor module; and a protrusion provided such that part of the container protrudes further than the inlet of the pressure guiding path. The temperature sensor module includes: a temperature detection device fixed at the tip of the protrusion; a lead wire covered with a lead wire protection material; a terminal connected to the temperature detection device via the lead wire; and a resin covering the temperature detection device, the lead wire and the terminal. The temperature detection device, the lead wire and the terminal are integrated together by the resin.

According to the temperature sensor integrated type semiconductor pressure sensor apparatus in accordance with the invention, the temperature detection device, the lead wire and the terminal are integrated together by the resin. So, the lead wire can be prevented from being deformed in the assembly process, the assembly process can be simplified, and the manufacturing cost can be reduced. Furthermore, the temperature detection device and the lead wire are covered with the resin, so, they can be protected from contaminant and corrosion product included in detected fluid.

The foregoing and other objects, features, aspects and advantages of the present invention will become more apparent from the following detailed description of the present invention when taken in conjunction with the accompanying drawings.

DETAILED DESCRIPTION OF THE PREFERRED EMBODIMENTS

First Embodiment

Figure 1:
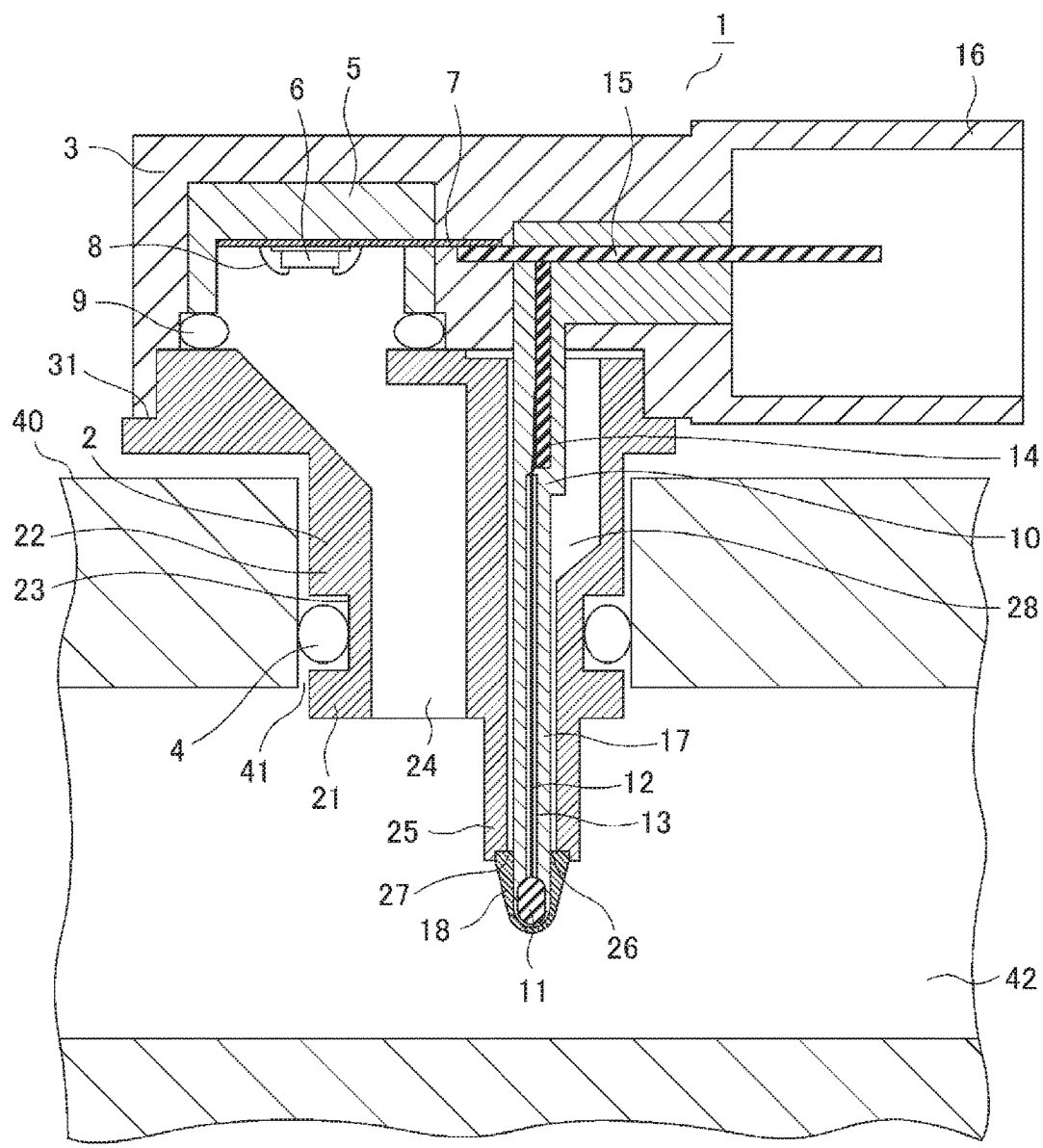
FIG. 1 is a cross-sectional view showing a temperature sensor integrated type semiconductor pressure sensor apparatus in accordance with a first embodiment of the invention.
Figure 2:
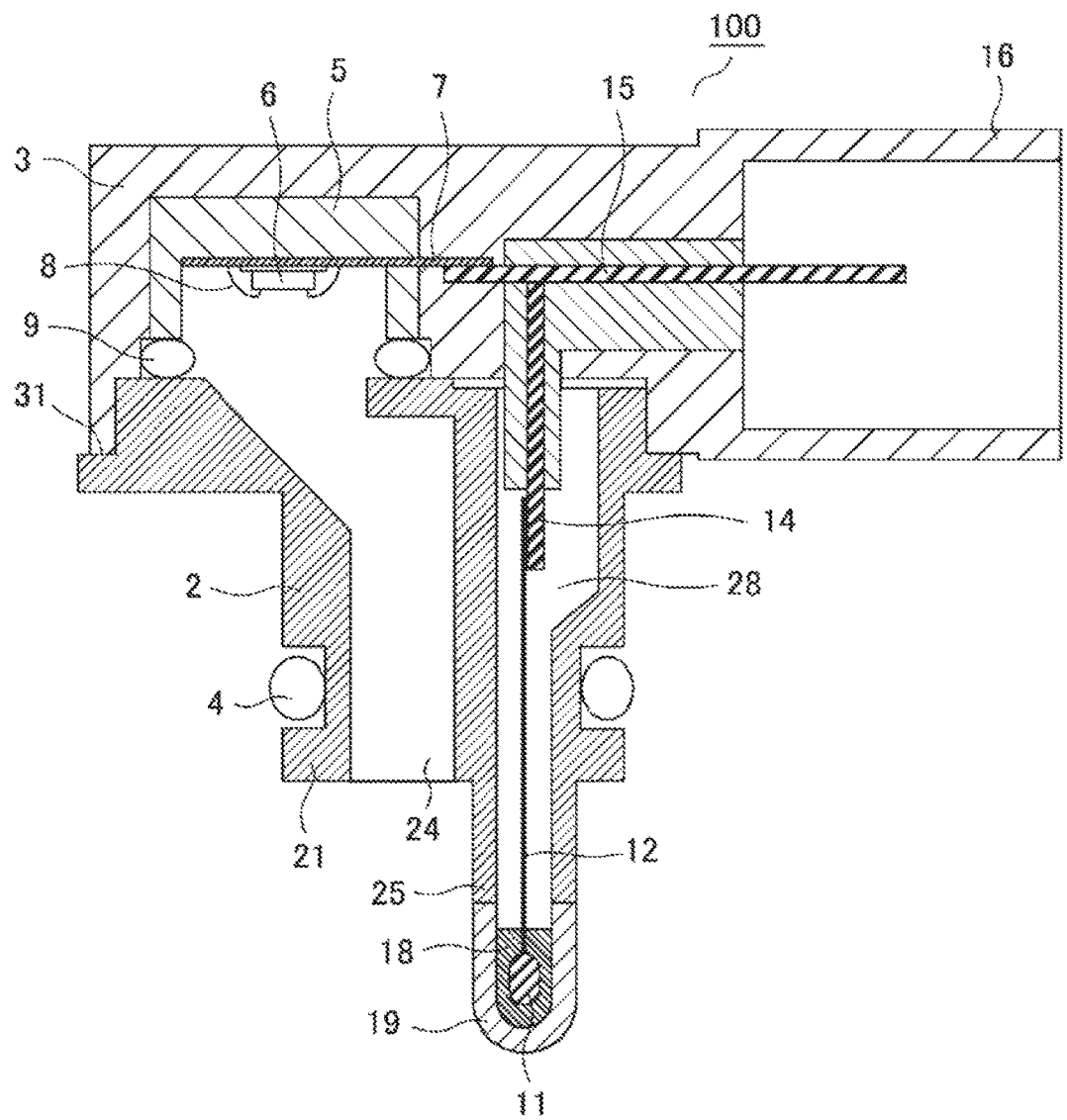
FIG. 2 is a cross-sectional view showing a conventional temperature sensor integrated type semiconductor pressure sensor apparatus.

A temperature sensor integrated type semiconductor pressure sensor apparatus in accordance with a first embodiment of the invention is described below with reference to the drawings. FIG. 1 is a cross-sectional view showing the temperature sensor integrated type semiconductor pressure sensor apparatus in accordance with the first embodiment. FIG. 2 is a cross-sectional view showing a conventional temperature sensor integrated type semiconductor pressure sensor apparatus as an comparison example. Note that, in the figures, the same or corresponding components are denoted by the same reference numerals.

A temperature sensor integrated type semiconductor pressure sensor apparatus 1 in accordance with the first embodiment (hereinafter abbreviated as a pressure sensor apparatus 1) is attached to a through hole 41 provided to a passage pipe 40, such as an intake manifold of an internal combustion engine, and detects a change in pressure and a change in temperature of detected fluid flowing in a passage 42 in the passage pipe 40, that is, intake air guided into a combustion chamber.

A pressure sensor module 5 included in the pressure sensor apparatus 1 and a temperature sensor module 10 attached to the pressure sensor module 5 are housed in a resin enclosure including a case 2 and a housing 3. The case 2 is joined to the outer periphery 31 of the housing 3 by welding or bonding. The case 2 and the housing 3 are formed of a thermoplastic resin, such as PBT resin or polyphenylenesulfide resin (PPS resin).

The housing 3 is made by connecting an external connection terminal 15 to a lead frame 7 of the pressure sensor module 5 by welding or soldering and then integrating them together by insert molding using PBT resin. The housing 3 has a concave connector 16 formed therein, and an end of the external connection terminal 15 is exposed inside the connector 16. The connector 16 is connected to a female connector (not shown) connected to a vehicle control unit.

A base portion 21 of the case 2 includes: a cylindrical portion 22 that is inserted into the through hole 41 in the passage pipe 40 and fixed; and a groove 23 within which an O-ring 4 is attached to the outer periphery of the cylindrical portion 22. The O-ring 4 prevents intake air in the passage 42 from leaking to the outside through the gap between the inner wall of the through hole 41 and the base portion 21.

The case 2 includes: a pressure guiding path 24 containing a pressure detection device 6 of the pressure sensor module 5; and a container 28 containing the temperature sensor module 10. The pressure guiding path 24 and the container 28 are provided adjacent to each other. The container 28 includes a protrusion 25 provided such that part of the container 28 protrudes further than the inlet of the pressure guiding path 24.

The pressure detection device 6 of the pressure sensor module 5 is fixed to a concave portion facing the pressure guiding path 24 with an adhesive, and is connected to the lead frame 7 via a wire 8 formed of gold or aluminum. The pressure detection device 6, the lead frame 7 and the wire 8 are covered with a protection member (not shown), such as fluorine gel or fluoro-silicone gel.

An O-ring 9 is provided between the pressure sensor module 5 and the case 2, and prevents intake air guided into the pressure guiding path 24 from leaking to the outside through between the pressure sensor module 5 and the case 2.

The pressure detection device 6 is a known device utilizing piezo resistance effect, and is a silicon semiconductor device including a diaphragm and a vacuum chamber. An electric circuit including a gauge resistor is formed on the diaphragm. The diaphragm is deformed in response to intake air pressure, then the resistance of the gauge resistor varies depending on the amount of deformation, and then the pressure is determined from the variation in the resistance.

The pressure detected by the pressure detection device 6 is converted into an electric signal and amplified, then output to the outside as an electric signal through the external connection terminal 15 of the connector 16. However, the pressure detection device 6 may include not only the electric circuit including the gauge resistor, but also an electric circuit including a capacitance or the like, for example.

The temperature sensor module 10 includes: a temperature detection device 11; a lead wire 12 covered with a lead wire protection material 13; and a terminal 14 connected to the temperature detection device 11 via the lead wire 12. The lead wire 12 is connected to the temperature detection device 11 and the terminal 14 by welding or soldering. Also, the terminal 14 is connected to the external connection terminal 15 by welding or soldering.

The temperature detection device 11 and the terminal 14 connected by the lead wire 12, and the external connection terminal 15 connected to the terminal 14 are covered with a thermoplastic resin 17, such as PBT resin, and integrated together by insert molding. Furthermore, one end of the external connection terminal 15 exposed from the thermoplastic resin 17 is connected to one end of the lead frame 7 of the pressure sensor module by welding or soldering, then they are covered with PBT resin and integrated together by insert molding to form the housing 3.

For the temperature detection device 11, a thermistor device or the like utilizing the change in electric resistance against temperature is used. For the thermoplastic resin 17, PPS resin may also be used in addition to PBT resin.

The protrusion 25 of the case 2 has an opening 26 at its tip, and the temperature detection device 11 is placed outside the container 28 through the opening 26. The inner space of the container 28 is formed to narrow toward the tip of the protrusion 25, and the temperature sensor module 10 is positionally regulated at the opening 26.

The protrusion 25 is cylindrical and has a concave portion 27 at the outer edge of the opening 26 that is more recessed than the remaining part. A seal member 18 is provided to seal the gap between the thermoplastic resin 17 of the temperature sensor module 10 and the opening 26, and is fitted into the concave portion 27 and fixed.

Note that, in the example shown in FIG. 1, the seal member 18 covers the temperature detection device 11 with the thermoplastic resin 17 in between. That is, the temperature detection device 11 detects the temperature of intake air through the thermoplastic resin 17 and the seal member 18. So, the seal member 18 is desirably a highly heat-conductive member. Note that silicone material, epoxy material or the like is used for the seal member 18, and may be coated by either filling or dipping.

As an comparison example against the pressure sensor apparatus 1 in accordance with the first embodiment, a conventional temperature sensor integrated type semiconductor pressure sensor apparatus is shown in FIG. 2. In a conventional temperature sensor integrated type semiconductor pressure sensor apparatus 100 (hereinafter abbreviated as a conventional pressure sensor apparatus 100), a temperature detection device 11 is housed within a highly heat-conductive member 19 attached to the tip of a protrusion 25, and is held by a seal member 18 filling the inside of the highly heat-conductive member 19.

In this way, part of the case 2 is made of the highly heat-conductive member 19, which can improve the temperature response of the temperature detection device 11, but, increases the manufacturing cost due to increase in the material cost and the forming process cost.

Also, in the assembly process of the conventional pressure sensor apparatus 100, a lead wire 12 connected to the temperature detection device 11 is connected to a terminal 14 integrated with a housing 3 by insert molding, then the seal member 18 is injected into the highly heat-conductive member 19 at the tip of the protrusion 25, and then the housing 3 is fitted to the case 2.

In the fitting, the lead wire 12 may interfere with the case 2 to be deformed. If the lead wire 12 is deformed, the position at which the temperature detection device 11 is housed deviates from an intended position, so the temperature detection accuracy decreases. In order to avoid such a situation, the temperature detection device 11 needs to be housed accurately at a defined position within the highly heat-conductive member 19, however, this work has difficulty in automation and is performed manually, which causes the manufacturing cost to be increased.

On the other hand, in the pressure sensor apparatus 1 in accordance with the first embodiment, the lead wire 12 covered with the lead wire protection material 13 and the temperature detection device 11 are integrated together by the thermoplastic resin 17. So, even if the lead wire 12 interferes with the case 2 when the housing 3 is fitted to the case 2, the lead wire 12 can be prevented from being deformed. This allows the fitting process to be automated, thereby simplifying the assembly process.

Furthermore, the temperature detection device 11 is exposed from the opening 26 at the tip of the protrusion 25, which can secure enough temperature response, and the highly heat-conductive member used for the seal member 18 covering the temperature detection device 11 can improve the temperature response. Furthermore, the temperature detection device 11, the lead wire 12 and the lead wire protection material 13 are covered with the thermoplastic resin 17, so they are protected from combustion gas component, oil contaminant and corrosion product included in intake air.

Figure 3:
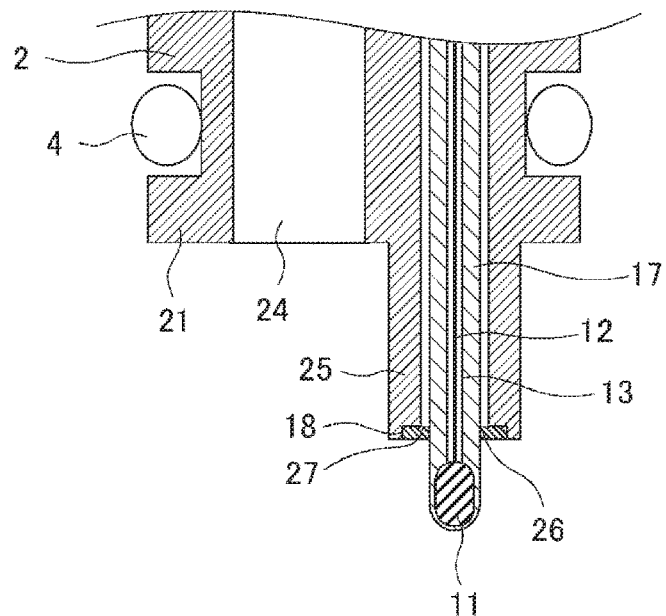
FIG. 3 is a cross-sectional view showing a variation of the temperature sensor integrated type semiconductor pressure sensor apparatus in accordance with the first embodiment of the invention.
Figure 4:
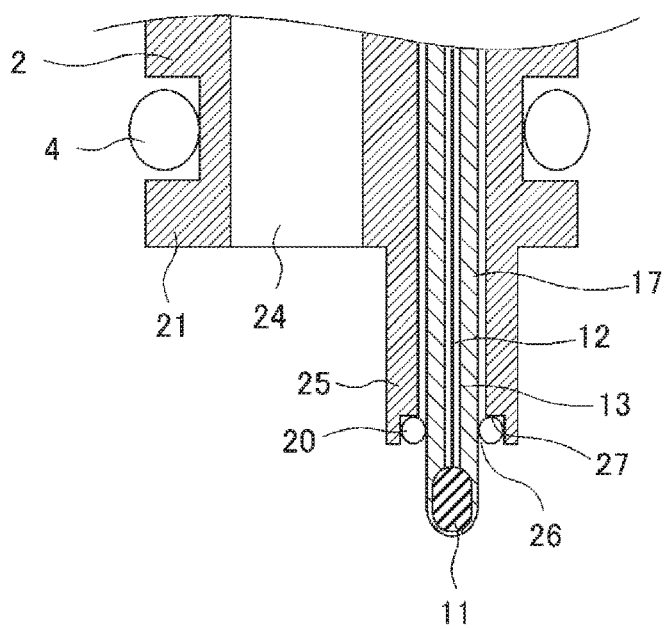
FIG. 4 is a cross-sectional view showing a variation of the temperature sensor integrated type semiconductor pressure sensor apparatus in accordance with the first embodiment of the invention.

FIGS. 3 and 4 show a variation of the temperature sensor integrated type semiconductor pressure sensor apparatus in accordance with the first embodiment. In the example shown in FIG. 3, only the inside of the concave portion 27 at the tip of the protrusion 25 is filled with the seal member 18, and the temperature detection device 11 is not covered with the seal member 18. This can reduce the amount of the seal member 18 to suppress the material cost. Furthermore, the surface of the temperature detection device 11 is covered with the thermoplastic resin 17 only, which can improve the temperature response.

In the example shown in FIG. 4, an O-ring 20 is used instead of the seal member 18 and fitted into the concave portion 27. Note that a packing may be used instead of the O-ring 20. This eliminates the need for the process of filling the concave portion 27 with the seal member 18 and curing the seal member 18, thereby simplifying the manufacturing process.

As described above, according to the first embodiment, the pressure sensor apparatus 1 can be provided that can secure the temperature response of the temperature detection device 11, can protect the temperature detection device 11, the lead wire 12 and the lead wire protection material 13 from contaminant and corrosion product included in intake air within the intake manifold, and can simplify the assembly process and reduce the manufacturing cost. Note that, according to the invention, the embodiment may be appropriately modified or omitted within the scope of the invention.

Various modifications and alterations of this invention will be apparent to those skilled in the art without departing from the scope and spirit of this invention, and it should be understood that this is not limited to the illustrative embodiments set forth herein.

What is claimed is:

1. A temperature sensor integrated type semiconductor pressure sensor apparatus in which a pressure sensor module and a temperature sensor module are contained in a resin enclosure,
wherein the resin enclosure includes: a pressure guiding path containing a pressure detection device of the pressure sensor module; a container provided adjacent to the pressure guiding path, containing the temperature sensor module; and a protrusion provided such that part of the container protrudes further than an inlet of the pressure guiding path,
wherein the temperature sensor module includes: a temperature detection device fixed at the tip of the protrusion; a lead wire covered with a lead wire protection material; a terminal connected to the temperature detection device via the lead wire; and a resin covering the temperature detection device, the lead wire covered with the lead wire protection material, and the terminal, and
wherein the temperature detection device, the lead wire and the terminal are integrated together by the resin, and
wherein a portion of the resin is provided between the lead wire protection material and an inner space of the container.

2. The temperature sensor integrated type semiconductor pressure sensor apparatus according to claim 1, wherein the inner space of the container is formed to narrow toward the tip of the protrusion.

3. The temperature sensor integrated type semiconductor pressure sensor apparatus according to claim 1, wherein the protrusion has an opening at a tip of the protrusion, and the temperature detection device is placed outside the container through the opening.

4. The temperature sensor integrated type semiconductor pressure sensor apparatus according to claim 3, wherein the protrusion is cylindrical and has a concave portion at the outer edge of the opening that is more recessed than the remaining part, and wherein a seal member is provided to seal the gap between the resin of the temperature sensor module and the opening, and is fitted into the concave portion and fixed.

5. The temperature sensor integrated type semiconductor pressure sensor apparatus according to claim 4, wherein the seal member covers the temperature detection device with the resin in between.

6. The temperature sensor integrated type semiconductor pressure sensor apparatus according to claim 4, wherein the seal member is an O-ring or a packing.

7. The temperature sensor integrated type semiconductor pressure sensor apparatus according to claim 1, wherein the resin is a thermoplastic resin.

* * * * *